(12) United States Patent
Lips

(10) Patent No.: US 9,351,450 B2
(45) Date of Patent: *May 31, 2016

(54) FLUID DRAINAGE SYSTEM AND METHODS

(71) Applicant: Virid Services, LLC, Parker, CO (US)

(72) Inventor: Jon Lips, Parker, CO (US)

(73) Assignee: Virid Services, LLC, Parker, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/617,252

(22) Filed: Feb. 9, 2015

(65) Prior Publication Data

US 2015/0305257 A1    Oct. 29, 2015

Related U.S. Application Data

(63) Continuation of application No. 13/864,064, filed on Apr. 16, 2013, now Pat. No. 8,950,418, and a continuation of application No. 12/724,927, filed on Mar. 16, 2010, now Pat. No. 8,424,550.

(51) Int. Cl.
| | |
|---|---|
| *G01F 15/00* | (2006.01) |
| *F16L 55/07* | (2006.01) |
| *A01G 25/00* | (2006.01) |
| *A01G 25/16* | (2006.01) |
| *G05B 15/02* | (2006.01) |
| *G05D 7/06* | (2006.01) |

(52) U.S. Cl.
CPC ............... *A01G 25/16* (2013.01); *A01G 25/00* (2013.01); *F16L 55/07* (2013.01); *G05B 15/02* (2013.01); *G05D 7/0623* (2013.01); *G05D 7/0635* (2013.01); *Y10T 137/0318* (2015.04); *Y10T 137/1298* (2015.04); *Y10T 137/1353* (2015.04); *Y10T 137/1963* (2015.04)

(58) Field of Classification Search
CPC ........ A01G 25/16; A01G 25/00; F16L 55/07; G05D 7/0623; G05D 7/0635; G05B 15/02; Y10T 137/1298; Y10T 137/1353; Y10T 137/0318; Y10T 137/1963
USPC ...................... 137/61, 62, 79, 624.12, 624.18
See application file for complete search history.

(56) References Cited

U.S. PATENT DOCUMENTS 8,950,418 B2 *   2/2015   Lips ..................... A01G 25/00
                                                          137/1

* cited by examiner

*Primary Examiner* — Kevin Lee

(57) ABSTRACT

A method for operating a fluid drainage control system to drain a fluid from a fluid dispensation system is provided. The method includes determining a first ambient air temperature, determining if the first ambient air temperature is less than a predetermined drain set point temperature, isolating the fluid dispensation system from a fluid supply source by closing a supply valve located inside a temperature controlled area in response to the first ambient air temperature being less than the predetermined drain set point temperature, and draining the fluid from the fluid dispensation system by opening a drain valve subsequent to closing the supply valve. The method further includes determining a second ambient air temperature, determining if the second ambient air temperature is greater than a predetermined operation set point temperature, closing the drain valve in response to the second ambient air temperature being greater than the predetermined operation set point temperature, and opening the supply valve subsequent to closing the drain valve.

11 Claims, 9 Drawing Sheets

| STATE | TEMPERATURE | SUPPLY VALVE(S) | DRAIN VALVE(S) | DISTRIBUTION VALVE(S) |
|---|---|---|---|---|
| A | Ambient temperature above operation set point temperature | open | closed | enabled and open as needed for fluid distribution |
| B | Ambient temperature drops below operation set point temperature | open | closed | enabled and open as needed for fluid distribution |
| C | Ambient temperature drops below drain set point temperature | closed | open | disabled |
| D | Ambient temperature rises above drain set point temperature | closed | open | disabled |
| E | Ambient temperature rises above operation set point temperature | open | closed | enabled and open as needed for fluid distribution |

Figure 4A

FLUID DRAINAGE SYSTEM AND METHODS

RELATED APPLICATIONS

This application is a continuation of application Ser. No. 13/864,064 (entitled "Fluid Drainage System and Methods"), filed Apr. 16, 2013, now U.S. Pat. No. 8,950,418, which is hereby incorporated by reference. This application also claims priority application Ser. No. 12/724,927 (entitled "Fluid Drainage System and Methods"), filed on Mar. 16, 2010, now U.S. Pat. No. 8,424,550, which is also hereby incorporated by reference in its entirety.

TECHNICAL BACKGROUND

Fluid dispensation systems are used in a wide variety of applications and enterprises. They are used to irrigate farmland, water residential landscaping, distribute fertilizers, distribute fluids and chemicals for industrial processes, as well as a wide variety of other uses. Fluid dispensation systems typically include a plurality of fluid dispensation components including pipes, valves, sprinklers, control devices, backflow prevention devices, as well as other types of devices for controlling how a fluid is moved throughout the distribution system.

Many fluid dispensation systems have branches or segments which operate in areas where there is little temperature control, no temperature control, or unexpected loss of temperature control due to power outage or other unexpected circumstances. The fluid dispensation system components which operate in these areas are often at risk of damage when freezing conditions occur. If the temperature in these areas drops below the freezing temperature of the fluid, expansive forces resulting from the freezing of the fluid within the fluid dispensation system may cause breaking, bursting, or cracking of the various components of the fluid dispensation system. In addition, other problems relating to unexpected or uncontrolled release of the fluid may result if the integrity of the fluid dispensation system is compromised.

Overview

In various embodiments, systems and methods are provided to operate a fluid drainage control system to drain a fluid from a fluid dispensation system. In an embodiment, a method for operating a fluid drainage control system to drain a fluid from a fluid dispensation system comprises determining a first ambient air temperature, determining if the first ambient air temperature is less than a predetermined drain set point temperature, isolating the fluid dispensation system from a fluid supply source by closing a supply valve located inside a temperature controlled area in response to the first ambient air temperature being less than the predetermined drain set point temperature, and draining the fluid from the fluid dispensation system. The fluid drainage control system then determines whether a second ambient air temperature is greater than a predetermined operation set point temperature, closes the drain valve in response to the second ambient air temperature being greater than the predetermined operation set point temperature, and opens the supply valve subsequent to closing the drain valve.

In another embodiment, a fluid drainage control system for draining fluid from a fluid dispensation system comprises a temperature sensor, at least one supply valve, at least one drain valve, fluid dispensation pipe, a communication interface configured to receive and transmit control signals, and a processing system coupled to the communication interface. The processing system is further configured to receive a first control signal through the communication interface from the temperature sensor indicating a first ambient temperature, and determine if the first ambient air temperature is less than a predetermined drain set point temperature. When this condition occurs, the processing system isolates the fluid dispensation pipe from a fluid supply source by sending a second control signal through the communication interface to close the supply valve and drains the fluid from the fluid dispensation pipe by sending a third control signal through the communication interface to open the drain valve subsequent to sending the second control signal.

The processing system is further configured to receive a fourth control signal from the temperature sensor through the communication interface indicating a second ambient temperature, determine a second ambient air temperature, and determine if the second ambient air temperature is greater than a predetermined operation set point temperature. If this condition exists, the processing system closes the drain valve in response to the second ambient air temperature being greater than the predetermined operation set point temperature by sending a fifth control signal through the communication interface. Finally, the processing system opens the supply valve by sending a sixth control signal through the communication interface subsequent to sending the fifth control signal. At this point, the fluid dispensation system has been returned to its initial state such that it can perform its primary fluid dispensation functions.

In another example embodiment, the fluid dispensation system comprises a fluid backflow prevention device and at least one drain valve on the input side of the backflow prevention device and at least one drain valve on the output side of the backflow prevention device. When the fluid drainage control system opens a drain valve to protect the system from freezing conditions, it opens the drain valves on both the input and output sides of the backflow prevention device.

In another example embodiment, the fluid drainage control system also has the ability to disable fluid distribution valves in the fluid dispensation system. The fluid distribution valves are disabled by the fluid drainage control system in response to the first ambient air temperature being less than the predetermined drain set point temperature. This precludes an irrigation control device from activating the fluid distribution valves on a normal schedule when the fluid distribution system is drained or otherwise not operational.

BRIEF DESCRIPTION OF THE DRAWINGS

FIG. 4A illustrates the operational states of a fluid drainage control system.

DETAILED DESCRIPTION

FIGS. 1-8 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments and variations of the invention. As a result, the invention is not limited to the specific embodiments described below, but only by the claims and their equivalents.

In order to avoid damage to a fluid dispensation system and the other affects of unexpected release of a fluid, it is desirable to create a system which detects the existence of temperature conditions which present a risk of damage and protects the fluid dispensation system from this damage. This may be accomplished by isolating the system from the fluid supply source, draining the fluid from the branches or segments which are at risk of damage, and disabling other distribution valves within the system when these temperature conditions are detected. It is also desirable for the system to detect when temperature conditions have recovered to the point where there is no longer risk of damage due to freezing and reconfigure the system such that normal fluid dispensation operations may resume.

Figure 1:
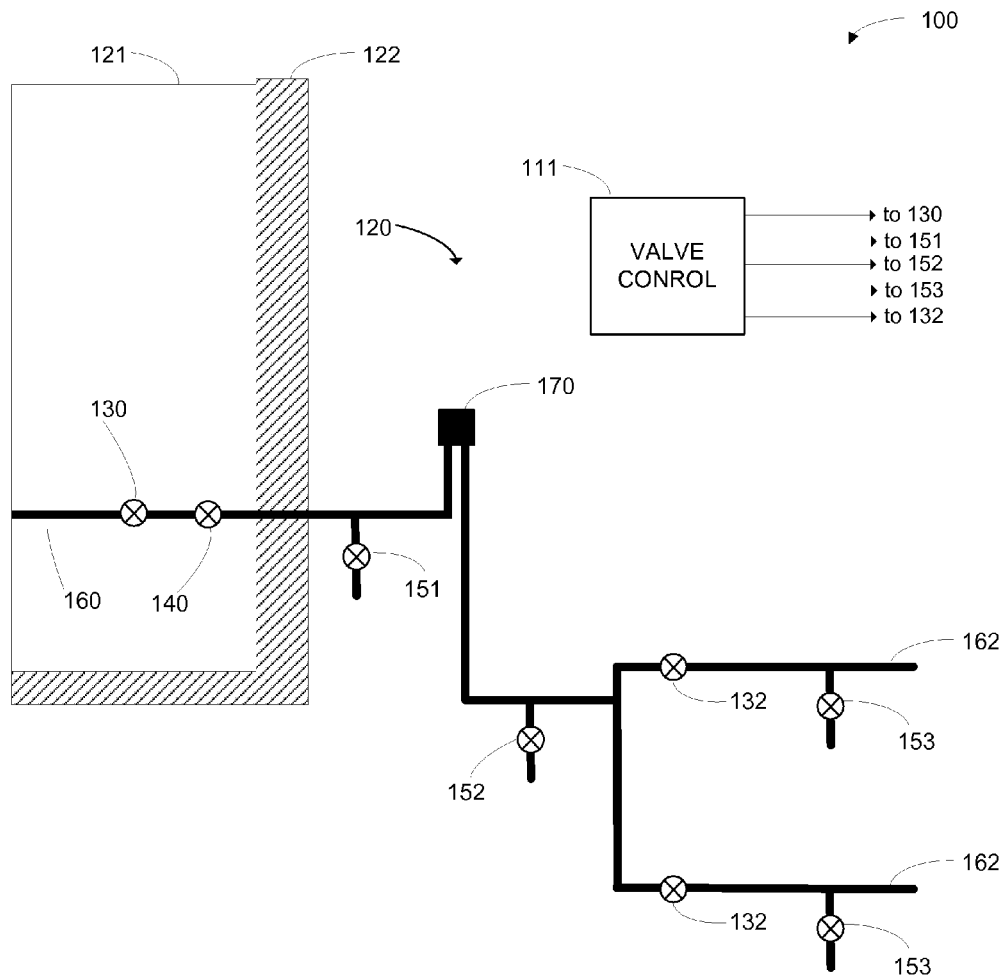
FIG. 1 illustrates a fluid drainage control system.

FIG. 1 illustrates fluid drainage control system 100. Fluid drainage control system 100 includes a fluid dispensation system and various elements to control the operation of the fluid dispensation system. The fluid dispensation system is comprised of fluid supply source 160, supply shut off valve 140, fluid backflow prevention device 170, fluid distribution pipe 162, and fluid distribution valves 132. The fluid dispensation system is designed to allow control over where and when fluid dispensation occurs. A portion of the fluid dispensation system is located within building structure 122. Building structure 122 may be any type of house, building, or enclosure in which temperature controlled area 121 of structure 122 is protected, at least partially, from ambient temperature variations which occur in uncontrolled space 120. Uncontrolled space 120 may be open outdoor space or may be another area, like a warehouse, where temperature control is difficult, impossible, or impractical. Supply valve 140 is a manually operated valve which may be used to isolate the fluid dispensation system from fluid supply 160 when it will not be used for extended periods of time.

Fluid drainage control system 100 controls the state of the fluid dispensation system using valve control 111. Valve control 111 determines a first ambient air temperature in uncontrolled space 120 and determines if the first ambient air temperature is less than a predetermined drain set point temperature stored by valve control 111. If the ambient air temperature in uncontrolled space 120 is less than the predetermined drain set point temperature, the portion of the fluid dispensation system in uncontrolled space 120 may be at risk of damage due to freezing. In response to this situation, valve control 111 isolates the fluid dispensation system from fluid supply source 160 by closing supply valve 130 located inside temperature controlled area 121. Valve control 111 then causes the fluid to be drained from the fluid dispensation system by opening any combination of drain valves 151, 152, or 153 subsequent to closing supply valve 130. Additional drain valves similar to drain valves 151, 152, and 153 may be located at various points within the fluid dispensation system to facilitate more thorough draining of the fluid dispensation system.

Fluid drainage control system 100 continues determining the ambient temperature in uncontrolled space 120. If fluid drainage control system 100 determines that the ambient air temperature is greater than a predetermined operation set point temperature stored in valve control 111, valve control 111 closes the drain valves in response to the current ambient air temperature reading being greater than the predetermined operation set point temperature stored in valve control 111. The fluid dispensation system is then returned to its initial state when valve control 111 opens supply valve 130.

Figure 2:
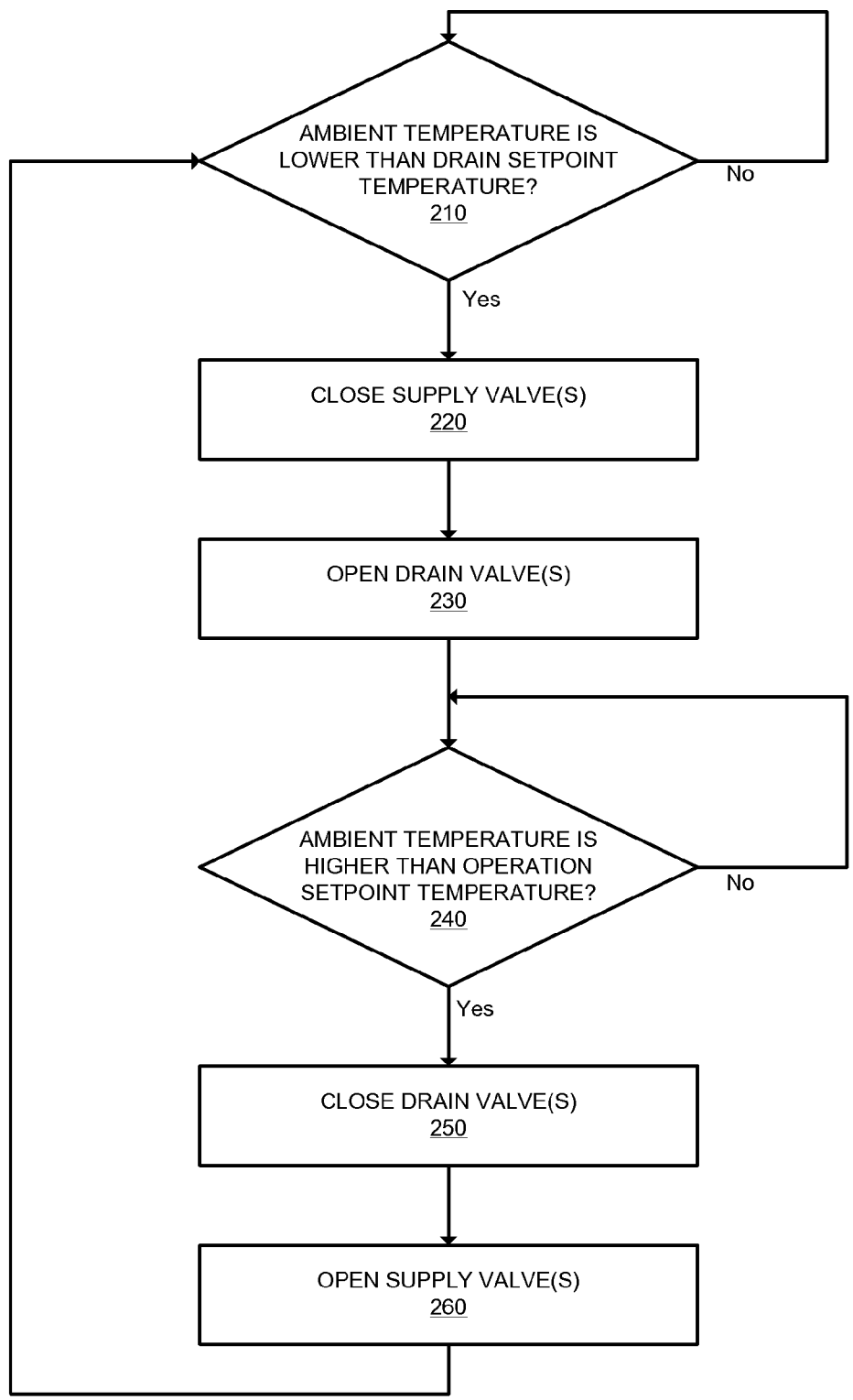
FIG. 2 illustrate the operation of a fluid drainage control system.

FIG. 2 is a flow chart illustrating a method for operating a fluid drainage control system to drain fluid from a fluid dispensation system. This example method may be performed by valve control 111 in fluid control system 100 of FIG. 1. Valve control 111 periodically determines the ambient temperature in uncontrolled space 120 to determine whether this ambient temperature is lower than a drain set point temperature (step 210). The drain set point temperature is preprogrammed or set by an operator of the system. If the ambient temperature drops below this temperature, valve control 111 closes one or more supply valves which connect the fluid dispensation to the fluid supply (step 220) and opens one or more drain valves in the fluid dispensation system (step 230). In this state, the fluid dispensation is protected from damage due to freezing because much of the fluid has been drained and it has been isolated from the fluid supply source so no additional fluid can enter the portion of the system which is exposed to the potentially damaging temperature variations.

Valve control 111 continues periodically determining the ambient temperature in uncontrolled space 120 and determines whether it is higher than an operation set point temperature (step 240). The operation set point temperature is preprogrammed or set by an operator of the system. If the ambient temperature rises above the set point temperature, valve control 111 closes the one or more drain valves (step 250) and opens the one or more supply valves in the fluid dispensation system (step 260).

Figure 3:
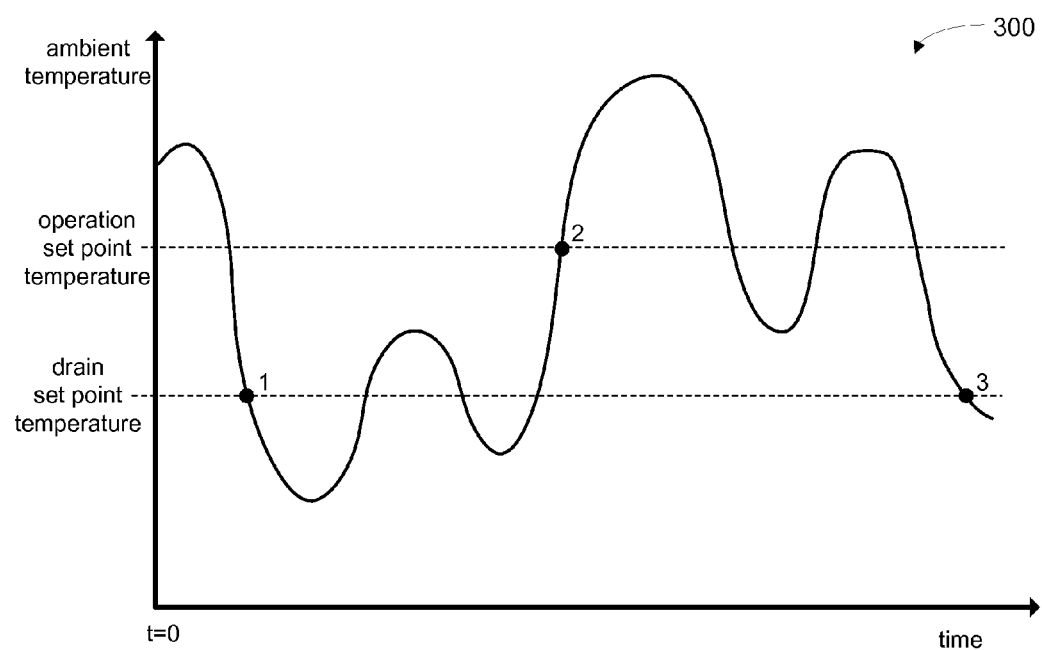
FIG. 3 illustrates the set point temperatures of a fluid drainage control system.

Graph 300 in FIG. 3 illustrates one example of when the operational steps of FIG. 2 would occur within a hypothetical temperature profile occurring over a period of time. At time t=0, the ambient temperature is higher than both the operation set point temperature and the drain set point temperature. Fluid drainage control system 100 is monitoring the ambient temperature in uncontrolled space 120 (step 210). When the ambient temperature drops below the operation set point temperature, no changes are made within the system. However, when the ambient temperature drops to the drain set point temperature (point 1), fluid drainage control system 100 closes one or more supply valves (step 220). The fluid drainage control system then opens one or more drain valves (step 230) in order to allow the fluid to escape.

Even if the ambient temperature rises above the drain set point temperature, no changes to the system configuration are made until the ambient temperature rises to the operation set point temperature (point 2). When this occurs (step 240), the one or more drain valves are closed (step 250). After the drain valves are closed, the one or more supply valves are opened (step 260). The fluid dispensation system has now been returned to its normal operational state in which it is able to dispense fluid from fluid supply source 160 through fluid supply pipes 162. It remains in this operational state even if the ambient temperature drops below the operation set point temperature but not below the drain set point temperature. The state of the drain and supply valves are not changed further until the ambient temperature again drops below the drain set point temperature (point 3).

As illustrated in FIG. 3, the operation set point temperature and the drain set point temperature may be set to different temperature values. This creates hysteresis in the system and eliminates the potential problem of frequent changes in the state of the system. If the operation set point temperature and the drain set point temperature were set to the same value, the system may change states multiple times within a relatively short period of time if the ambient temperature was hovering near that single, shared set point temperature. The problems of frequent system state changes associated with slight ambient temperature variations of this nature are avoided by using an operation set point temperature which is higher than the drain set point temperature.

Figure 4B:
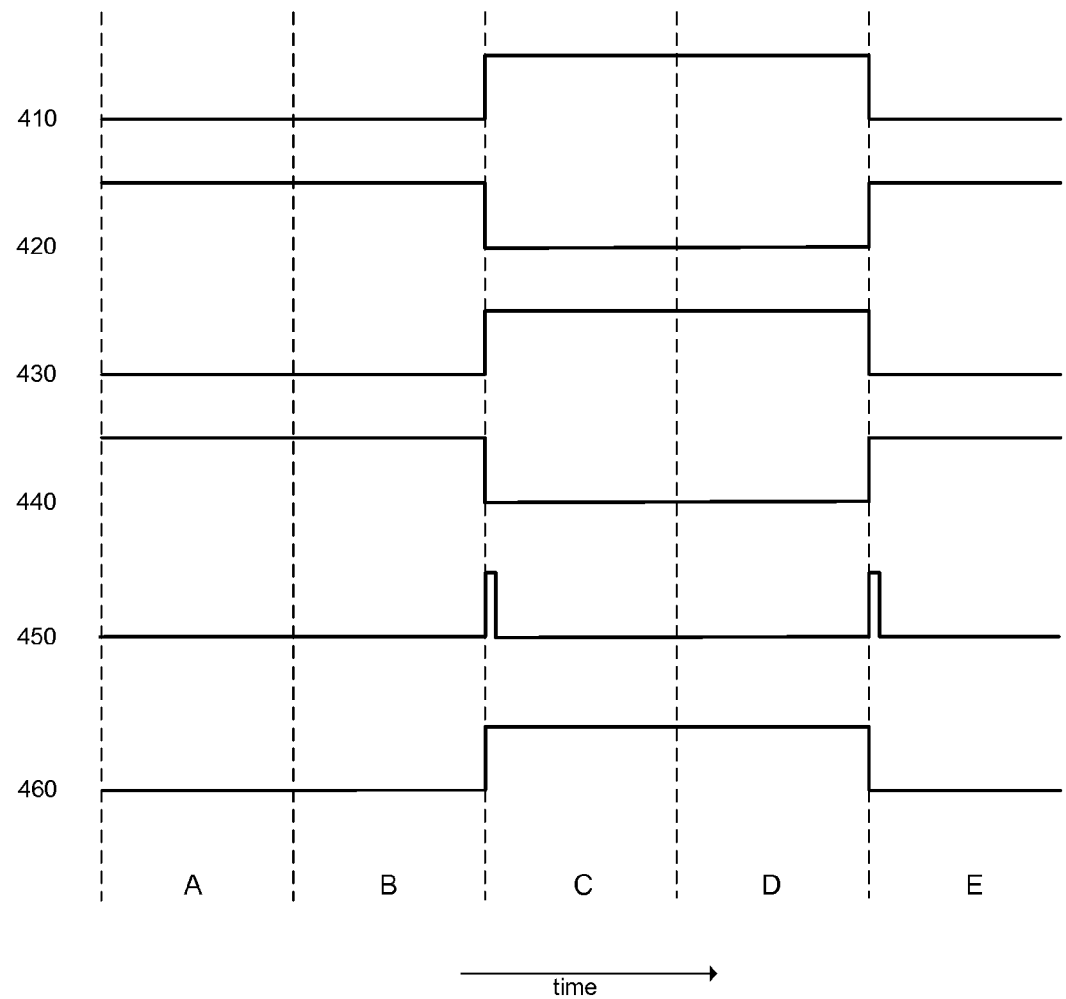
FIG. 4B illustrates the control signals used to operate a fluid drainage control system.

FIGS. 4A and 4B illustrate the different logical states of fluid drainage control system 100 and the state of the associated control signals which valve control 111 sends to valves 130, 132, 151, 152, and 153. Each of these valves may be a normally open valve, a normally closed valve, or a latched solenoid valve. A normally open valve is open and will allow fluid to flow through it when it is not energized or in a deactivated state. When energized or activated, the normally open valve will toggle to a closed state and not allow fluid to flow through it. A normally closed valve operates in the opposite manner by prohibiting fluid from flowing through when it is not energized or in a deactivated state and only allowing fluid flow when it is energized or activated. A latched solenoid valve changes state, from open to closed or from closed to open, each time it receives a short electrical pulse. It remains in its current state without being energized until another electrical pulse is received. Since any of these valve types may be used, the description of the operational states and descriptions of control signals which follow describe the control signals necessary to operate the system using each of the valve types. However, the system could be implemented using valves of various types in any combination.

With respect to FIG. 4B, valve control 111 controls normally open supply valves using control signal 410. Valve control 111 controls normally closed supply valves using control signal 420. Valve control 111 controls normally closed drain valves using control signal 430. Valve control 111 controls latched solenoid valves using control signal 450. Valve control 111 controls normally open drain valves using control signal 440. Control signal 460 is used by valve control 111 to enable or disable the fluid distribution valves 132 which are used in the operation of the fluid dispensation system.

In FIG. 4A, state A occurs when the ambient temperature is above the operation set point temperature. Valve control 111 sends a low/off control signal 410 to open normally open supply valves, if any, and sends a high/on control signal 420 to open normally closed supply valves, if any. At the same time, valve control 111 may send a low/off control signal 430 to close normally closed drain valves, if any, and sends a high/on control signal 440 to close normally open supply valves, if any. In addition, valve control 111 leaves the fluid distribution valves enabled by sending a low/off control signal 460.

State B of FIG. 4A occurs when the ambient temperature was previously above the operation set point temperature and subsequently drops below the operation set point temperature. Under these circumstances, no changes are made to any of control signals 410-460 and the state of each valve remains unchanged from state A.

However, when the ambient temperature drops further and drops below the drain set point temperature, the system transitions to state C of FIG. 4A. Valve control 111 sends a high/on control signal 410 to close normally open supply valves and sends a low/off control signal 420 to close normally closed supply valves. At the same time, valve control 111 may send a high/on control signal 430 to open normally closed drain valves and sends a low/off control signal 440 to open normally open supply valves. A pulse is sent on control signal 450 to close latched solenoid supply valves, if any, and open latched solenoid drain valves, if any. In addition, valve control 111 disables the fluid distribution valves by sending a high/on control signal 460.

When the ambient temperature was previously below the drain set point temperature and subsequently rises above the drain set point temperature, the system transitions to state D of FIG. 4A. Under these circumstances, no changes are made to any of control signals 410-460 and the status of each valve remains unchanged from state C.

When the ambient temperature once again rises above the operation set point temperature, the system transitions to state E of FIG. 4A. Valve control 111 sends a low/off control signal 410 to open normally open supply valves and sends a high/on control signal 420 to open normally closed supply valves. At the same time, valve control 111 may send a low/off control signal 430 to close normally closed drain valves and sends a high/on control signal 440 to close normally open supply valves. A pulse is sent on control signal 450 to close latched solenoid drain valves and open latched solenoid supply valves. In addition, valve control 111 enables the fluid distribution valves by sending a low/off control signal 460.

Figure 5:
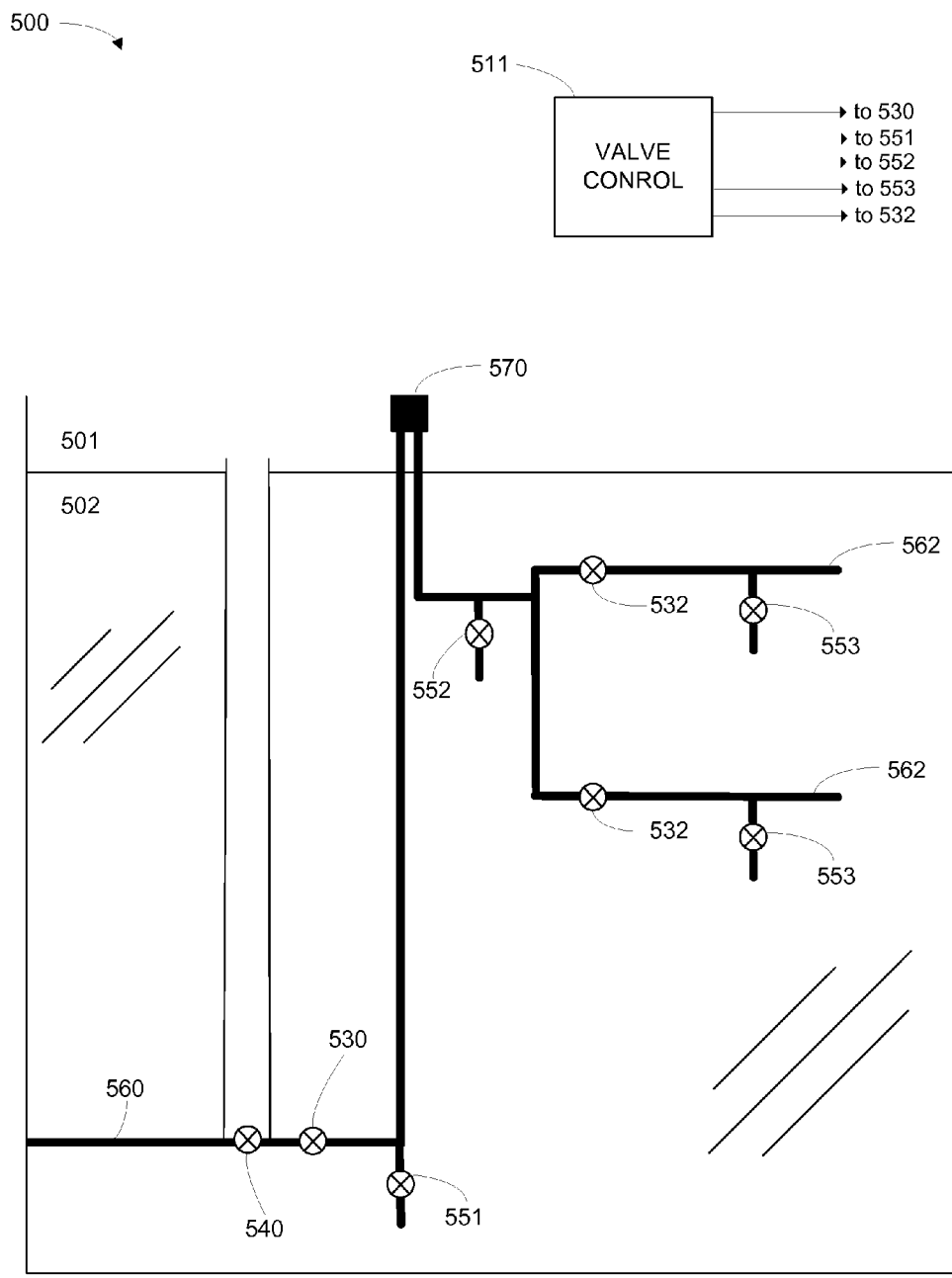
FIG. 5 illustrates a fluid drainage control system.

FIG. 5 illustrates fluid drainage control system 500. Fluid drainage control system 500 includes a fluid dispensation system and various elements to control the operation of the fluid dispensation system. The fluid dispensation system is comprised of fluid supply source 560, supply shut off valve 540, fluid backflow prevention device 570, fluid distribution pipe 562, and fluid distribution valves 532. Supply valve 540 is a manually operated valve which may be used to isolate the fluid dispensation system from fluid supply 560 when the fluid dispensation system will not be used for extended periods of time. The fluid dispensation system is designed to allow control over where and when fluid dispensation occurs. Most of the fluid dispensation system, with the exception of fluid backflow prevention device 570, is located in underground area 502 which is protected from short term temperature variations occurring in ambient air area 501. Backflow prevention device 570 is subjected to these short term temperature variations because it is located in ambient air area 501.

Fluid drainage control system 500 controls the fluid dispensation system using valve control 511. Valve control 511 determines a first ambient air temperature in ambient air area 501 and determines if the first ambient air temperature is less than a predetermined drain set point temperature which is stored by valve control 511. If the ambient air temperature in ambient air area 501 is less than the predetermined drain set point temperature, the portion of the fluid dispensation system in ambient air area 501 or close to the surface of underground area 502 may be at risk of damage due to freezing. In response to this situation, valve control 511 isolates the fluid dispensation system from fluid supply source 560 by closing supply valve 530. Valve control 511 then causes the fluid to be drained from the fluid dispensation system by opening any combination of drain valves 551, 552, or 553 subsequent to closing supply valve 530. Additional drain valves may be located at various points within the fluid dispensation system to further facilitate the draining of the fluid dispensation system.

Fluid drainage control system 500 periodically determines the ambient temperature of ambient air area 501. If fluid drainage control system 500 determines that the ambient air temperature is greater than a predetermined operation set point temperature stored in valve control 511, valve control 511 closes drain valves in response to the current ambient air temperature reading being greater than the predetermined operation set point temperature stored in valve control 511. When valve control 511 opens supply valve 530, the fluid dispensation system is returned to its initial state such that it can perform its primary fluid dispensation functions.

Figure 6:
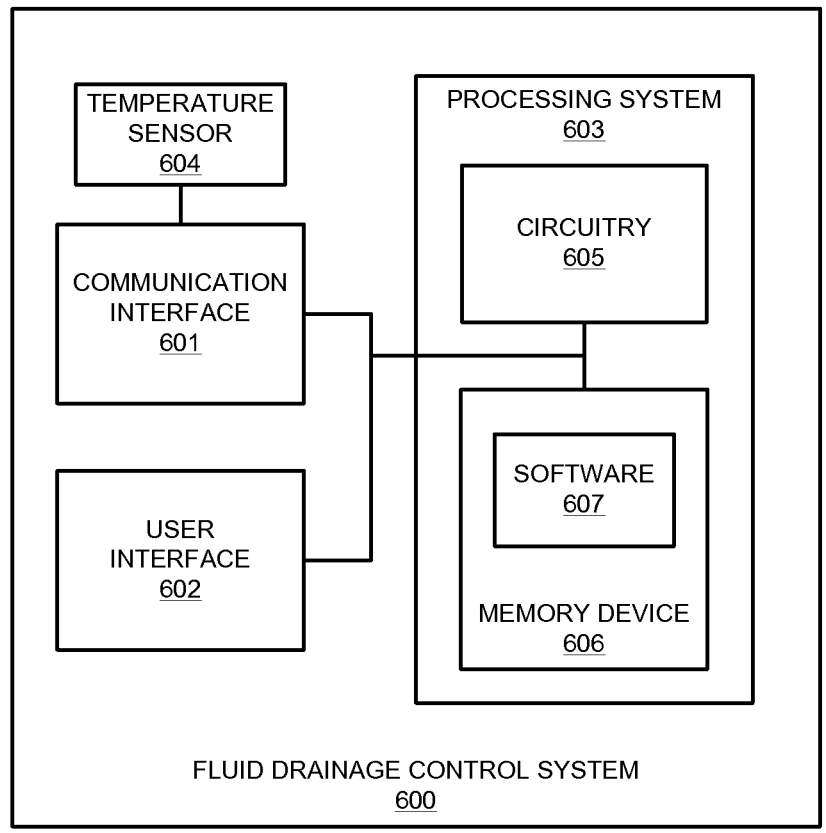
FIG. 6 illustrates a fluid drainage control system.

FIG. 6 illustrates fluid drainage control system 600. Fluid drainage control system 600 comprises processing system 603, temperature sensor 604, communication interface 601, and user interface 602. Processing system 603 comprises electronic circuitry 605 and memory device 606. Software used to operate processing system 603 is stored within memory device 606. Temperature sensor 604 is operatively coupled to communication interface 601 by a communication link. Both communication interface 601 and user interface 602 are operatively coupled to processing system 603 by a communication link.

Figure 7:
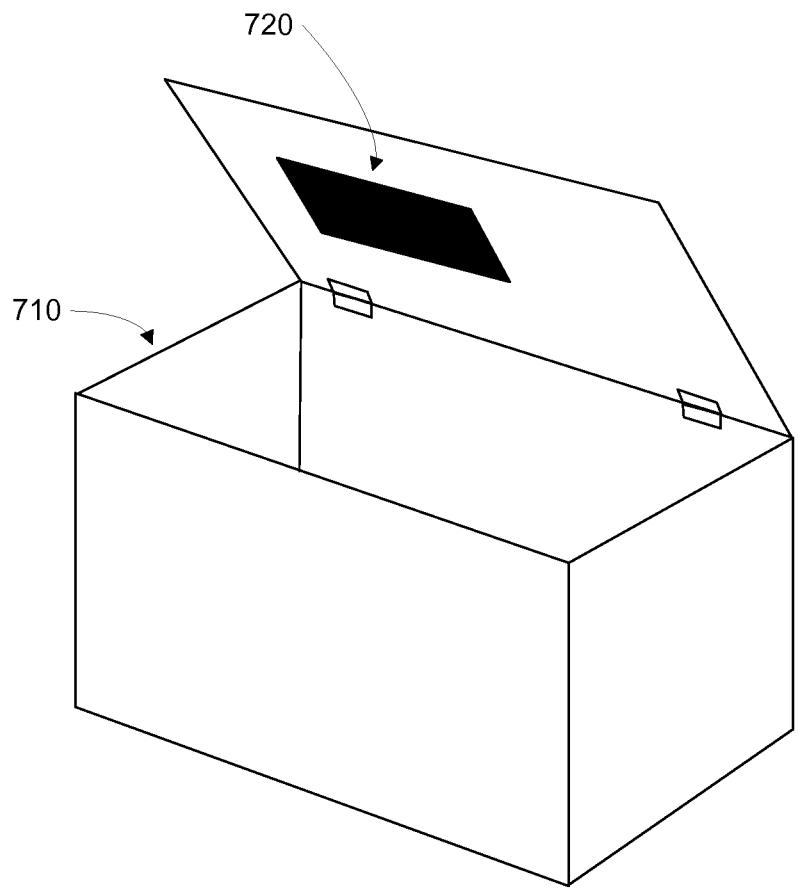
FIG. 7 illustrates the location of a fluid drainage control system.

FIG. 7 illustrates fluid drainage control system 720 mounted inside enclosure 710. Enclosure 710 is located in an area which is exposed to the ambient temperatures against which the fluid dispensation system is being protected. Enclosure 710 protects the fluid drainage control system from rain, moisture, sunlight, tampering, and other undesired forces while still allowing ambient temperature measurements to be made. Enclosure 710 may contain holes or ports which are open to the ambient environment such that the temperature measurements are more accurate while still providing the desired protection. Enclosure 710 may contain other components of the fluid dispensation system including, but not limited to, controllers, valves, or components related to injecting fluid additives into the fluid dispensation system. Fluid drainage control system 720 may be mounted inside the lid of enclosure 710, as illustrated, or elsewhere within enclosure 710.

Figure 8:
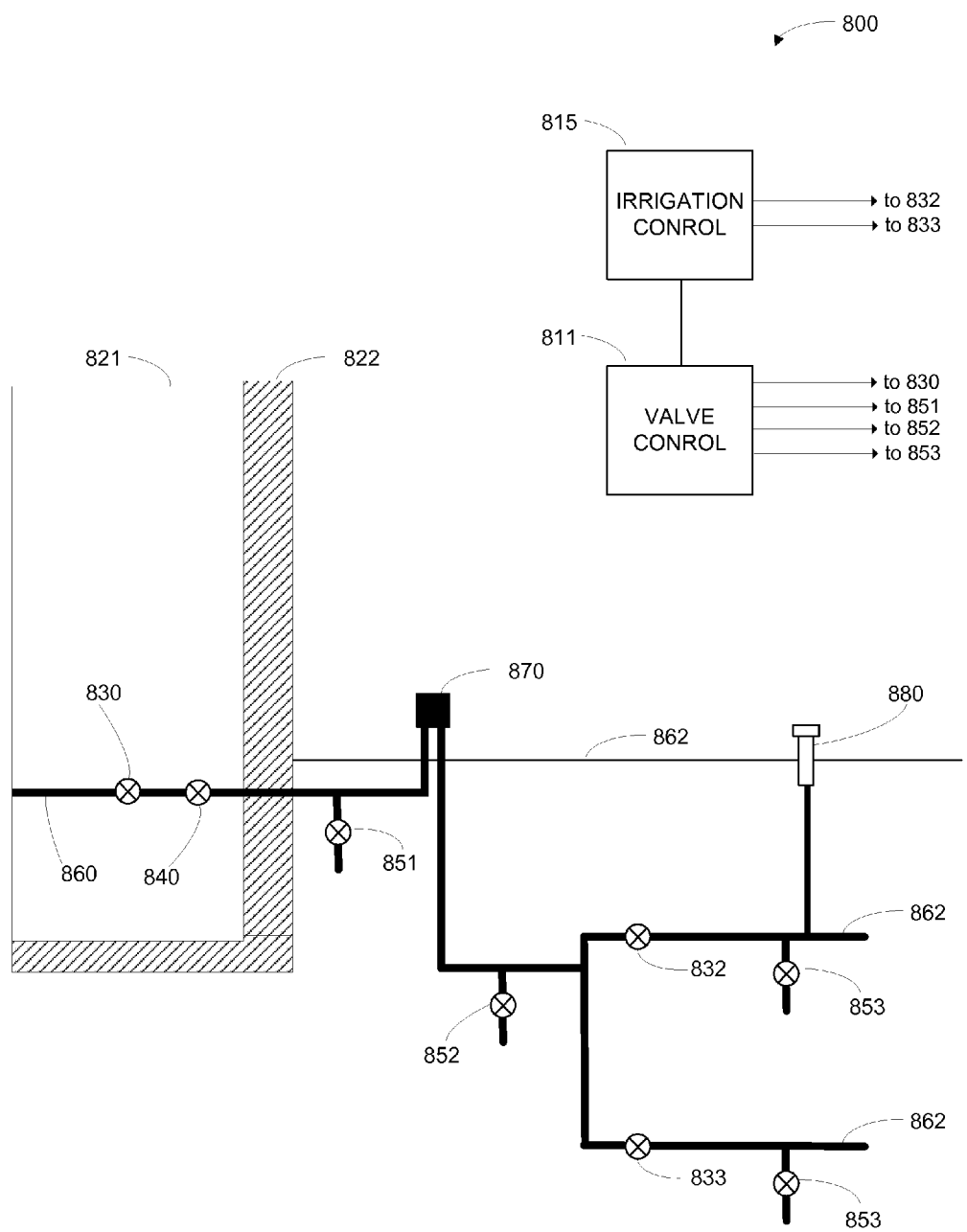
FIG. 8 illustrates a fluid drainage control system.

FIG. 8 illustrates fluid drainage control system 800 for use with a lawn sprinkler irrigation system. The lawn sprinkler system comprises various elements to irrigate lawn 862 in a controlled manner. The lawn sprinkler system is comprised of pressurized water source 860, supply shut off valve 840, water backflow prevention device 870, sprinkler pipe 862, sprinkler valves 832 and 833, irrigation control unit 815, and a plurality of lawn sprinklers 880. The lawn area is divided into sections or regions each of which is served by a separate set of lawn sprinklers 880 on a separate irrigation channel. The supply of water to each irrigation channel is controlled by an individual sprinkler valve 832 or 833.

Irrigation control 815 controls which areas of the lawn get watered, when they get watered, and how long they get watered and does so in accordance with a programmed schedule by individually actuating sprinkler valves 832 and 833. When sprinkler valve 833 is actuated, pressurized water supply 860 is allowed to flow through to the plurality of lawn sprinklers 880 which are attached to that irrigation channel thereby delivering water to that section of the lawn. Supply valve 840 is a manually operated valve which may be used to isolate the lawn sprinkler system from pressurized water supply 860 when irrigation will not occur for long periods of time, in winter for example.

A portion of the lawn sprinkler system is located within a house 822. This portion of the lawn sprinkler system may be located in an above grade portion of the house, in a basement, or in a garage. The interior of house 822 contains a temperature controlled area 821 which is protected, at least partially, from the ambient temperature variations which occur outdoors. The portion of the lawn sprinkler system inside house 822 is protected from temperature variations which may cause damage due to freezing, but the portion of the lawn sprinkler system which is outside of house 822 may be damaged if it is full of water and subjected to freezing conditions. Even those portions which are below ground surface 862 may be at risk of damage depending on how far below ground surface 862 they are buried. Backflow prevention device 870 may be the most vulnerable to freeze damage because it may be required to be exposed above ground surface 862 for functional reasons.

Fluid drainage control system 800 controls the fluid dispensation system using valve control 811. Valve control 811 determines a first outdoor ambient air temperature and determines if the first outdoor ambient air temperature is less than a predetermined drain set point temperature stored by valve control 811. The drain set point temperature may be preset in valve control 811 or programmed by the user. The drain set point temperature will be near the freezing temperature of water but need not be exactly the freezing temperature of water. In some circumstances, it may be acceptable for the drain set point temperature to be slightly below the freezing temperature of water. This is possible because the combination of the thermal mass of the water, the thermal mass of the lawn system components, and the heat given off by the earth will normally keep the water in the lawn sprinkler system from freezing if the ambient outdoor temperature is only a few degrees below the freezing temperature of the fluid in the system.

If the ambient outdoor air temperature drops below the predetermined drain set point temperature, the lawn sprinkler system may be at risk of damage due to freezing. In response, valve control 811 isolates the fluid dispensation system from fluid supply source 860 by closing supply valve 830 located inside house 822. Valve control 811 then causes the fluid to be drained from the fluid dispensation system by opening any combination of drain valves 851, 852, or 853 subsequent to closing supply valve 830. In addition, valve control 811 may disable sprinkler valves 832 and 833 during the time which the system is drained. This may be accomplished by sending a control signal directly to sprinkler valves 832 and 833 or by sending a control signal to irrigation control 815 as illustrated in FIG. 8. The purpose is to inhibit the unnecessary actuation of sprinkler valves 832 and 833 when the lawn sprinkler system has been drained by the fluid drainage control system and is not otherwise operable.

Water is drained from the lawn sprinkler system primarily through gravity. The lawn sprinkler system may have sections which exist at different elevations in order to accommodate design features or due to the natural features of the landscape which is being irrigated. As a result, additional drain valves similar to drain valves 851, 852, and 853 may be located at various points within the fluid dispensation system to facilitate the gravity driven draining of the lawn sprinkler system. Alternately, the drain valves may provide connection to a vacuum system which pulls the water out of the lawn sprinkler system through suction. In either case, small quantities of water may remain in the lawn sprinkler system after the drainage process is completed. However, the risk of damage from freezing is small because the system is no longer under pressure and there are large pockets of air which can accommodate expansion of any remaining water which may freeze.

After the lawn sprinkler system has been drained, fluid drainage control system 800 continues determining the outdoor ambient temperature. If fluid drainage control system 800 determines that the ambient air temperature is greater than a predetermined operation set point temperature stored in valve control 811, valve control 811 closes drain valves in response to the current ambient air temperature reading being greater than the predetermined operation set point temperature stored in valve control 811. Valve control 811 then opens supply valve 830 and enables sprinkler valves 832 and 833. At this point, the lawn sprinkler system has been returned to its initial state such that it can perform its schedule lawn irrigation functions according to the schedule in irrigation control 815.

Valve control 811 may be implemented in multiple different forms. For example, valve control 811 may exist separately from irrigation control 815 as illustrated in FIG. 8 or the functions of valve control 811 may be implemented utilizing the circuitry, software, user interface, and other components which are already present within irrigation control 815. In the latter case, the various elements illustrated in FIG. 6 may be in different physical locations. In order to determine ambient outdoor temperature, temperature sensor 604 would still need to be in an area exposed to the temperatures of interest. Consequently, a portion of valve control 811 may be located in irrigation control 815 and a portion in enclosure 710 illustrated in FIG. 7.

What is claimed is:

1. A method for remotely communicating with a fluid drainage control system to drain a fluid from a fluid dispensation system comprising:
   determining if a first ambient air temperature is less than a predetermined drain set point temperature;
   communicating an isolation instruction to isolate the fluid dispensation system from a fluid supply source by closing a supply valve located inside a temperature controlled area in response to the first ambient air temperature being less than the predetermined drain set point temperature;
   communicating a drain instruction to drain the fluid from the fluid dispensation system by opening a drain valve subsequent to closing the supply valve;
   determining if a second ambient air temperature is greater than a predetermined operation set point temperature;
   communicating a close instruction to close the drain valve in response to the second ambient air temperature being greater than the predetermined operation set point temperature; and
   communicating an open instruction to open the supply valve subsequent to closing the drain valve.

2. The method of claim 1 wherein the fluid drainage control system controls a plurality of drain valves.

3. The method of claim 2 wherein the fluid dispensation system comprises a fluid backflow prevention device;
   wherein one of the plurality of drain valves is on the input side of the backflow prevention device; and
   wherein a second of the plurality of drain valves is on the output side of the backflow prevention device.

4. The method of claim 1 wherein the fluid drainage control system controls a plurality of supply valves.

5. The method of claim 1 wherein the fluid drainage control system disables fluid distribution valves in the fluid dispensation system in response to the first ambient air temperature being less than the predetermined drain set point temperature.

6. The method of claim 1 wherein the fluid drainage control system electrically actuates the supply valve and electrically actuates the drain valve.

7. The method of claim 6 wherein the supply valve is in a normally open state when not energized.

8. The method of claim 6 wherein the drain valve is in a normally closed state when not energized.

9. The method of claim 6 wherein the supply valve or the drain valve is a latched solenoid valve.

10. The method of claim 1 wherein the predetermined drain set point temperature is different than the operation set point temperature.

11. The method of claim 1 wherein the fluid drainage control system is implemented within a fluid dispensation system controller.

* * * * *